(12) United States Patent
Gasthaus et al.

(10) Patent No.: US 6,393,114 B1
(45) Date of Patent: May 21, 2002

(54) SWITCHING EQUIPMENT FOR SETTING UP A CONNECTION BETWEEN AT LEAST TWO TELEPHONE SUBSCRIBERS

(75) Inventors: Elisabeth Gasthaus; Peter Hanselka, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/423,941
(22) PCT Filed: May 7, 1998
(86) PCT No.: PCT/EP98/02689
  § 371 Date: Nov. 15, 1999
  § 102(e) Date: Nov. 15, 1999
(87) PCT Pub. No.: WO98/52338
  PCT Pub. Date: Nov. 19, 1998

(30) Foreign Application Priority Data

May 13, 1997 (DE) .......................................... 97107807

(51) Int. Cl.$^7$ ............................................ H04M 15/00
(52) U.S. Cl. ...................... 379/134; 379/133; 379/268; 379/269; 379/279
(58) Field of Search ...................... 379/1.01, 9, 15.01, 379/12.05, 112.06, 114.01, 133–134, 268–269, 279, 284

(56) References Cited

U.S. PATENT DOCUMENTS

| 4,899,336 A | * | 2/1990 | Baur et al. |
| 5,513,255 A | * | 4/1996 | Yoo et al. |
| 5,513,257 A | * | 4/1996 | Yoo et al. |
| 5,655,120 A | * | 8/1997 | Witte et al. |

* cited by examiner

*Primary Examiner*—Duc Nguyen
(74) *Attorney, Agent, or Firm*—Bell, Boyd & Lloyd LLC

(57) ABSTRACT

Switching equipment for setting up a connection between at least two pieces of terminal equipment wherein terminal equipment-related supplementary information such as, for example, the telephone number of calling terminal equipment is transmitted in addition to the actual voice information. In order to prevent an overload of an exchange processor means of the individual exchange units, it is inventively proposed to provide monitoring means that monitor the usage degree of the individual exchange processor means and, given upper transgression of a specific usage degree, delay the enable of second transmission units provided for the transmission of the terminal equipment-related supplementary information dependent on the usage degree of the corresponding exchange processor means.

11 Claims, 3 Drawing Sheets

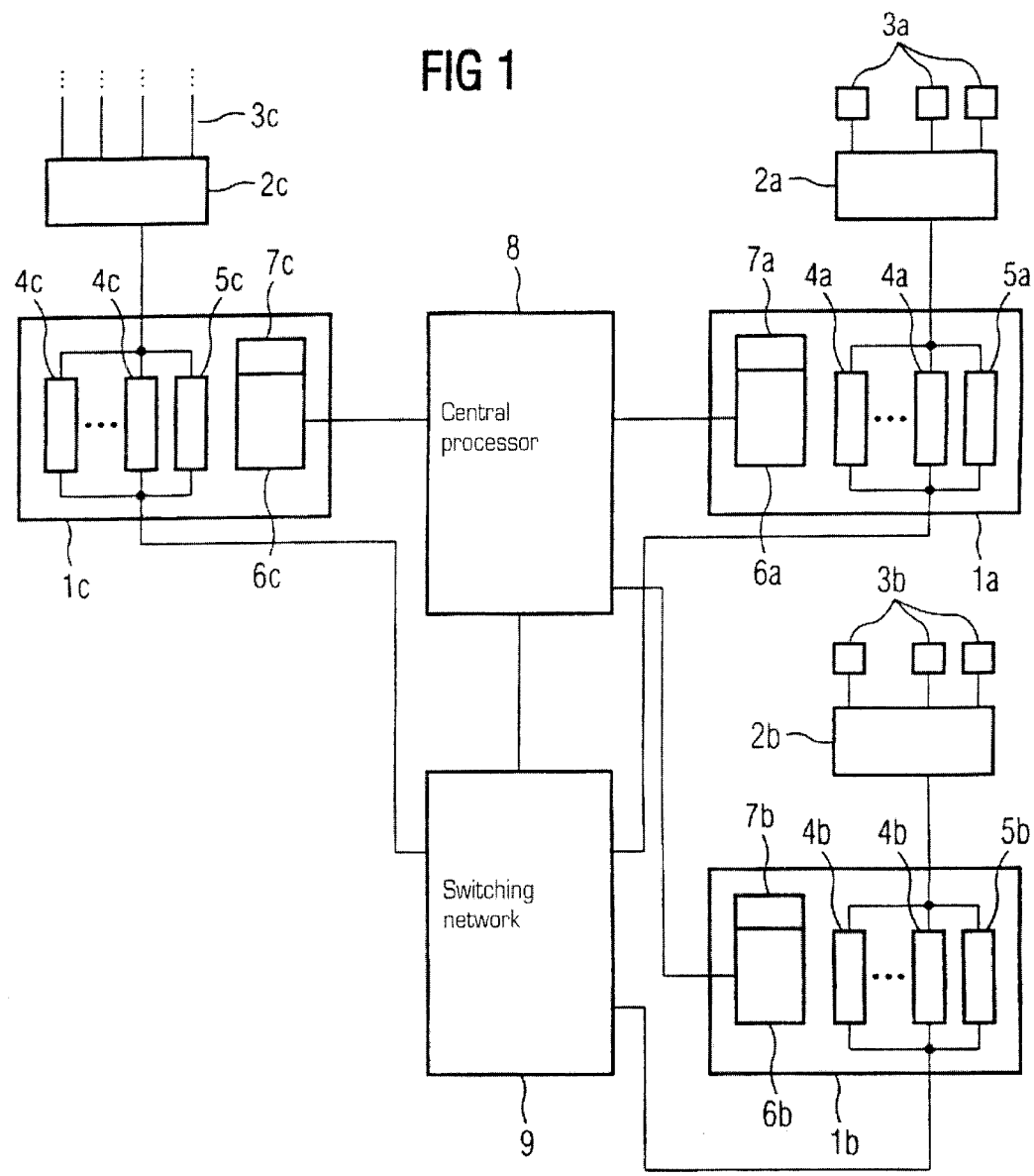

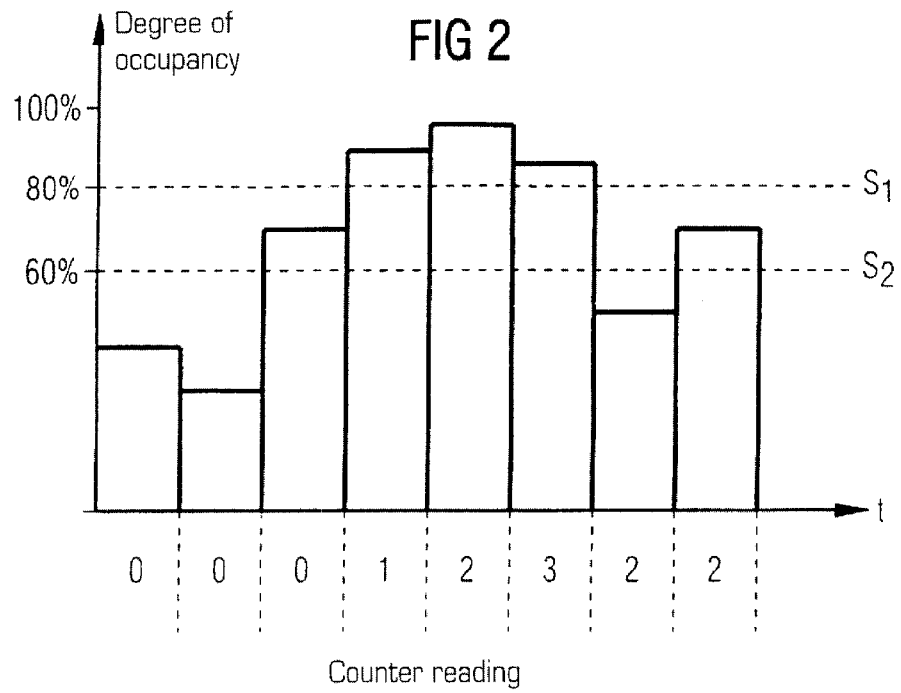

FIG 4

| tm [s] -> | 1,5 | | | 3 | | |
|---|---|---|---|---|---|---|
| tm-lengthening by [s] | tm | BHHCA | Reduction to | tm | BHHCA | Reduction to |
| - | 1,5 | 7200 | (100%) | 3,0 | 3600 | (100%) |
| 1 | 2,5 | 4320 | 60% | 4,0 | 2700 | 75% |
| 2 | 3,5 | 3086 | 43% | 5,0 | 2160 | 60% |
| 3 | 4,5 | 2400 | 33% | 6,0 | 1800 | 50% |
| 4 | 5,5 | 1964 | 27% | 7,0 | 1543 | 43% |
| 5 | 6,5 | 1662 | 23% | 8,0 | 1350 | 38% |
| 6 | 7,5 | 1440 | 20% | 9,0 | 1200 | 33% |
| 7 | 8,5 | 1271 | 18% | 10,0 | 1080 | 30% |
| 8 | 9,5 | 1137 | 16% | 11,0 | 982 | 27% |
| 9 | 10,5 | 1029 | 14% | 12,0 | 900 | 25% |
| 10 | 11,5 | 939 | 13% | 13,0 | 831 | 23% |
| 11 | 12,5 | 864 | 12% | 14,0 | 771 | 21% |
| 12 | 13,5 | 800 | 11% | 15,0 | 720 | 20% |
| 13 | 14,5 | 745 | 10% | 16,0 | 675 | 19% |
| 14 | 15,5 | 697 | 10% | 17,0 | 635 | 18% |
| 15 | 16,5 | 655 | 9% | 18,0 | 600 | 17% |
| 16 | 17,5 | 617 | 9% | 19,0 | 568 | 16% |
| 17 | 18,5 | 584 | 8% | 20,0 | 540 | 15% |
| 18 | 19,5 | 554 | 8% | 21,0 | 514 | 14% |
| 19 | 20,5 | 527 | 7% | 22,0 | 491 | 14% |
| 20 | 21,5 | 502 | 7% | 23,0 | 470 | 13% |

SWITCHING EQUIPMENT FOR SETTING UP A CONNECTION BETWEEN AT LEAST TWO TELEPHONE SUBSCRIBERS

BACKGROUND OF THE INVENTION

1. Field of the Invention

The present invention relates to switching equipment for setting up a telephone connection between at least two telephone subscribers which can be employed both in a public exchange, wherein inter-exchange lines for connection to the public telephone network are connected in addition to local subscribers, and in a private telephone private branch exchange.

2. Description of the Prior Art

As known, such switching equipment is utilized for setting up a telephone connection between two pieces of telephone terminal equipment or, respectively, between terminal equipment and an exchange line connected to the switching equipment. The switching equipment, thereby, particularly serves to select and to switch the corresponding connecting path. As a result of a connection setup, voice information or data are exchanged or, respectively, transmitted between the corresponding subscribers via the switching equipment. The transmission of this voice information is, thereby, usually subject to a charge; i.e., the subscribers must pay fees to the operator of the switching equipment as well as to the operator of the telephone network connected thereto for the duration of the setup and maintenance of the connection. These charges are generally born by the calling party.

In addition to the actual connection setup for the purpose of a transmission of voice information, modern exchanges offer further services that can be used by the subscribers connected thereto subject to a charge. One of these additional services, for example, is being informed of the telephone number of the calling party. In this way, the called party or, respectively, the recipient is informed of the telephone number of the calling party during the setup of the telephone connection wherein, for example, such number is displayed on a display of his telephone set. The called party [sic] can, thus, identify the calling party before accepting the call. It is known to connect an incoming call through to a busy subscriber who is already speaking to another subscriber. This procedure is generally referred to as "call waiting," wherein the called party is informed of the arrival of a new call by, for example, an acoustic signal with which the telephone number of the calling party can be output. The called party can, thus, decide whether he wishes to end the existing connection and accept the newly arriving call. It is likewise possible to switch between the two connections. Given digital telephone networks such as, for example, the ISDN, these services already have been largely realized.

For making use of such a service, as a result whereof further information is transmitted via the switching equipment or, respectively, this connecting path in addition to the voice information, a lump-sum, for example a basic monthly fee, is usually charged. Such change is typically independent of the duration of the connection setup.

Such switching equipment includes a central or coordination processor that controls the transmission of the voice and auxiliary information between two subscribers or, respectively, between a subscriber and a public exchange line. Further, the switching equipment includes a plurality of exchange units to which a plurality of subscribers (i.e., terminal equipment) or, respectively, a plurality of the inter-exchange lines are respectively connected. Each of these exchange units thus serves for the administration of that information which refers to the subscribers respectively connected thereto. The exchange units include separate transmission units for the voice and auxiliary information. Whereas the central processor coordinates the individual exchange units, each exchange unit has an exchange processor means (referred to below simply as exchange processor) that is provided for the control of the corresponding exchange unit and, in particular, coordinates the transmission of the voice or, respectively, additional information within an exchange unit.

For example, the transmission of the telephone number of the calling party thereby occurs as follows: an arriving call is communicated to the central processor via the corresponding exchange assembly or, respectively, exchange unit to which the calling party also is connected, whereby the telephone number of the calling party is communicated to the central processor. On the basis of the destination telephone number selected by the calling party, the central processor identifies the corresponding, called subscriber and selects that exchange unit that is responsible for the called subscriber. The exchange processor present in the exchange unit accesses a list in which a note as to whether the individual subscriber is technologically ready for the reception and the display of telephone numbers, and is also authorized to do so (for example, by paying a monthly lump-sum fee), is entered for every subscriber connected to this exchange unit. In this way, the exchange unit checks whether the telephone number of the calling party can be transmitted to the called subscriber. The result of this check is communicated from the exchange processor of the transmission unit to the central processor. As a rule, each exchange unit may include one or more transmission units for the transmission of telephone numbers. When the result of the check by the exchange unit in view of the reception authorization of the telephone number of a calling party was positive, the central processor selects one of the transmission units and informs this transmission unit of the telephone number of the calling party so that the selected transmission unit can send the telephone number to the requested subscriber.

Since the exchange processor provided in each exchange unit also serves for the control or, respectively, coordination of the transmission of voice information via the corresponding exchange unit, it can be seen that an additional load on the exchange processor of the corresponding exchange unit is produced by offering the possibility of transmitting further auxiliary information such as, for example, the telephone number of a calling party, in addition to the voice information. Since each exchange processor serves for the setup or, respectively, cleardown of the individual connections, the load on the exchange processor increases given shorter connection durations. In particular, the duration of the occupancy of a transmission unit within an exchange unit provided for the transmission of the telephone number is relatively short and amounts, for example, to less than three seconds, so that the corresponding transmission unit, after receiving the request for transmission of the telephone number, converts this request into a corresponding signal to the desired subscriber within three seconds. Due to this short occupancy duration of the transmission units provided for the transmission of the telephone numbers, an intense usage of this performance feature can arise, so that an overload of the exchange processor can occur. An overload of the exchange processor, however, is at the expense of the actual switching technology, i.e. of the connection setup for voice information, since an exchange unit, given an overload of the corresponding exchange processor, must react with self-limitation, i.e. rejects new occupancy requests, so that the actual switching technology, i.e. the connection serving for the actual transmission of voice information, can be displaced due to an intense utilization of the possibility of telephone number transmission. Since, given an overload, the corresponding exchange unit rejects a certain percentage (for example, between 25 and 100%) of the newly arriving occupancy requests dependent on the degree of overload, these calls are lost. Operators thus also lose the charges that would otherwise have arisen given these calls.

The present invention is therefore based on the object of fashioning a switching equipment according to the preamble of claim 1 such that an intense utilization of the transmission possibility of additional information is not at the expense of the normal call processing, i.e. transmission of voice information.

This object is inventively achieved by a switching equipment according to claim 1.

The subclaims describe advantageous embodiments of the present invention.

Inventively, monitoring means are provided that monitor the degree of usage of the individual exchange processors and, after identifying an impending overload of an exchange processor, delay the enable of the transmission unit of an arbitrary exchange unit provided for the transmission of additional information; for example, telephone numbers.

In particular, the occupancy duration of the transmission unit provided for the transmission of additional information is artificially lengthened in this way dependent on the degree of usage of the corresponding exchange processor. The occupancy of the transmission unit of an exchange unit provided for the transmission of additional information is known to the central processor. Upon arrival of a request for telephone number transmission, the central processor selects a transmission unit initially identified as free and marks this as busy. After the end of the transmission of the telephone numbers, the corresponding exchange unit, in turn, reports the release of the transmission unit to the central processor. Since, in case of an overload of an exchange processor, the transmission unit provided for the transmission of additional information is reported to the central processor as busy longer than normally required, this transmission unit of the corresponding exchange unit cannot be employed for the transmission of telephone number information or other terminal equipment-related additional information. As such, no additional load on the exchange processor can occur in the corresponding exchange unit due to the transmission of such supplementary information by this transmission unit that is busy for a longer time. The exchange processor of the corresponding exchange unit can thus recover. An adequate capacity is always present for the "normal" call processing; i.e., for the actual switching technology for the transmission of voice information.

The above-described defense measure is advantageously already activated before the actual load of the corresponding exchange processor becomes so high that newly arriving calls must be rejected. This means that the inventively provided monitoring means already can recognize an impending overload of the exchange processor before an overload of the exchange processor can actually occur. For this reason, a specific load limit value is defined, wherein the monitoring means responds when this is upwardly transgressed and artificially lengthens the occupancy time of the transmission unit provided for the transmission of supplementary information.

This load limit value lies below that usage degree that would, in fact, lead to an overload of the corresponding exchange processor.

In this way, a certain priority over the transmission of supplementary information such as, for example, the transmission of the telephone number of a calling party that is usually charged with a lump sum, is accorded to the actual, chargeable switching technology for the transmission of voice information.

Additional features and advantages of the present invention are described in, and will be apparent from, the Detailed Description of the Preferred Embodiments and the Drawings.

DESCRIPTION OF THE DRAWINGS

FIG. 1 shows a preferred block diagram schematic of a embodiment of the switching equipment of the present invention;

FIGS. 2 and 3 show graphical and chart illustrations for explaining the identification of an impending overload of an exchange processor means in an exchange unit shown in FIG. 1; and FIG. 4 shows a table for illustrating the effect of the application of the inventive principle.

DETAILED DESCRIPTION OF THE PREFERRED EMBODIMENTS

The present invention is described below with reference to the preferred embodiment shown in FIG. 1. What is thereby shown is switching equipment in the form of a public exchange. However, it is to be pointed out that the present invention is not limited to such public exchanges but also can be employed in private branch telephone exchanges.

Further, the present invention is described below for that case wherein the telephone number of a calling party is to be transmitted as supplementary information via the switching equipment in additional to the actual voice information. The present invention, however, is likewise not limited to this embodiment, but can be applied anywhere that additional services are offered by the switching equipment in addition to the actual transmission of voice information. As such, supplementary information can be transmitted to connected terminal equipment as a result of these services, wherein the supplementary information leads to an additional load on the exchange processors of the individual exchange units. Thus, for example, it is conceivable that the name of the calling party, etc., also can be transmitted instead of the telephone number of a calling party.

Given the exemplary embodiment shown in FIG. 1, a central or coordination processor means 8 (referred to below simply as central or coordination processor) is provided that coordinates the transmission of all information between a plurality of exchange units 1a–1c. Since the exemplary embodiment shown in FIG. 1 is a matter of switching equipment formed as public exchange, at least one exchange unit 1c to which one or more inter-exchange lines 3c are connected in order to be able to setup a connection to remote subscribers via the public network is provided in addition to a plurality of exchange units 1a, 1b to which local subscribers or, respectively, terminal equipment 3a, 3b are directly connected. The terminal equipment 3a, 3b or, respectively, the inter-exchange lines 3c are connected to the corresponding exchange unit 1a–1c via, preferably, digital interfaces 2a–2c.

The individual exchange units 1a–1c are essentially identically constructed and respectively contain an exchange processor means 6a–6c (referred to simply below as exchange processor) and a first transmission unit 5a–5c for the transmission of voice information. Each exchange unit 1a –1c also preferably has at least one second transmission unit 4a–4c for the transmission of supplementary information, particularly for the transmission of the telephone number of a calling party in the present case. Advantageously, each exchange unit 1a–1c may include a plurality of these second transmission units for the transmission of telephone number information. Inventively, however, it suffices when at least one of the exchange units 1a–1c has at least one second transmission unit 4a–4c for the transmission of the supplementary information, whereas other exchange units 1a–1c also can be configured without such a second transmission unit.

Further, a switching network 9 is provided that serves for the circuit-oriented realization of a (telephone) connection between the individual exchange units 1a–1c, wherein the connecting path within the switching network 9 is determined or, respectively, selected by the central processor 8 dependent on the subscribers participating in the connection to be setup.

Pursuant to the present invention, monitoring means are provided that monitor the degree of occupancy of the individual exchange processors 6a–6c and delay the enable of the second transmission units 4a–4c of the corresponding exchange unit 1a–1c when a specific usage degree of a switching processor is upwardly exceeded. Given the exemplary embodiment shown in FIG. 1, separate monitoring means 7a–7c are provided for each individual exchange unit 1a–1c. These, in particular, are integrated in the individual exchange processors 6a–6c. However, it is also conceivable to provide a central monitoring means that monitors all exchange processors 6a–6c, and reacts accordingly given recognition of an impending overload of one of these exchange processors.

Apart from the function of the monitoring means 7a–7c, the functioning of the switching equipment shown in FIG. 1 essentially corresponds to that of the known switching equipment initially set forth.

An arriving call of a subscriber is communicated to the central processor 8 together with the destination telephone number of a requested subscriber, being communicated thereto via the interface 2a–2c and the first transmission unit 5a–5c as well as the exchange processor 6a–6c of the corresponding exchange unit 1a–1c. On the basis of the destination telephone number received in this way, the central processor 8 determines that exchange unit 1a–1c to which the corresponding subscriber is connected. Dependent on the exchange unit selected in this way, the central processor 8 controls the switching network 9 such that a connection is set up between the exchange unit responsible for the calling party and the exchange unit responsible for the receiving party. Each exchange unit 1a–1c also contains an internal switching network (not shown in FIG. 1 for the sake of clarity) that is correspondingly driven by the corresponding exchange processor in order to thus switch the connections of the subscriber to the central, main switching network 9 via the internal switching network. After the setup of the connection and acceptance of the connection by the called subscriber, the desired call can be carried between the subscribers, wherein the voice information transmitted is controlled by the exchange processors of the corresponding exchange units.

Given the exemplary embodiment shown in FIG. 1, telephone number information also is transmitted between the individual subscribers in addition to the voice information, being transmitted in order to inform the called subscriber of the telephone number of the calling party. The central processor 8 also is informed of the telephone number of the calling party together with an incoming call of a subscriber. After the central processor 8—as was set forth above—has selected the exchange unit 1a–1c responsible for the destination subscriber, the central processor 8 informs the exchange processor 6a–6c of the corresponding exchange unit 1a–1c that telephone number information exists. The exchange processor 6a–6c of the corresponding exchange unit subsequently accesses an internal list wherein it is noted for each subscriber selected by the corresponding exchange unit as to whether the corresponding subscriber is technologically equipped for the reception of the telephone number of a calling party and also is authorized to receive telephone number information. A subscriber usually acquires the authorization by paying a lump-sum, monthly charge to the operator of the switching equipment. In this way, the corresponding exchange processor 6a–6c can inform the central processor 8 whether the telephone number information can or, respectively, should be transmitted to the called subscriber. When this answer back has a positive outcome, the central processor 8, in turn, accesses a list wherein it is noted which of the second transmission units 4a–4c is busy or free at the moment for each exchange unit 1a–1c. In this way, the central processor 8 determines an arbitrary, second transmission unit identified as free in the list and selects this for the transmission of the telephone number information of the calling party. The central processor 8 communicates the corresponding telephone number information to this second transmission unit. Preferably, the individual second transmission units that are provided for the transmission of the telephone number information are formed by modum audio generators that, for example, include a plurality of transmitters for sending the telephone number information to the terminal equipment connected thereto. Each of these modum audio generators can, in particular, include three FSK transmitters (frequency shift keying). Further, each modum audio generator can be provided with a receiver for testing purposes. As a result of the control by the corresponding exchange processor 6a–6c, the second transmission unit 4a–4c selected by the central processor 8 converts the telephone information to be sent into an FSK signal and transmits this to the requested destination subscriber. The telephone number information is preferably transmitted to the requested destination subscriber before the destination subscriber has accepted the corresponding call by picking up the receiver. Thus, for example, the telephone information can be transmitted between the first and second rings at the called terminal equipment.

After the central processor 8 has selected one of the second transmission units 4a–4c for the transmission of the telephone number information, a note is made in the corresponding, internal list of the central processor 8 to the effect that the selected, second transmission unit is busy at the moment. As a rule, the average occupancy duration between the arrival of the request for the transmission of the telephone number information and the conversion of the telephone number information into a corresponding signal, as well as the transmission of this signal to the requested subscriber, amounts to approximately three seconds in a second transmission unit. After the end of the telephone number transmission, the corresponding exchange processor 6a–6c informs the central processor 8 that the previously selected, second transmission unit 4a–4c is again available for future transmissions of telephone number information; i.e., the pre-processor 6a–6c, in turn, releases the corresponding second transmission unit 4a–4c so that the central processor 8 can note in its internal list that this second transmission unit 4a, 4c is again available. All second transmission units 4a–4c that are available or, respectively, busy are thus known to the central processor 8 at all times.

It can be seen from the above description that the exchange processors 6a–6c are provided both for controlling the first transmission units 5a–5c as well as for controlling the second transmission units 4a–4c. As such, a load on the corresponding pre-processor 6a–6c is produced given occupancy of one of these transmission units 4a–4c or, respectively, 5a–5c.

It is inventively proposed to monitor the degree of usage of the pre-processor of an exchange unit. To this end, the monitoring means 7a–7c are provided that monitor the usage degree of the corresponding pre-processor 6a–6c and, given recognition of a specific usage degree, see to it that all second transmission units 4a–4c of the corresponding switching unit 1a–1c remain blocked longer than originally provided. To this end, the monitoring means 7a–7c, after recognition of a usage of the corresponding exchange processor 6a–6c exceeding the specific usage degree. Use the pre-processor 6a–6c to delay the enable of all second transmission units 4a–4c of the corresponding exchange unit.

In particular, the duration of this delay is selected dependent on the degree of usage of the corresponding exchange processor; i.e., the enable of the corresponding, second transmission units is delayed longer by the monitoring means with increasing degree of usage of the corresponding exchange processor. In this way, it is inventively assured that, since the second transmission units of an exchange unit artificially blocked for a longer time are identified as unavailable in the central processor 8, no load on the corresponding exchange processor due to transmissions of telephone numbers can occur. Thus the corresponding exchange processor can, in turn, recover and adequate capacities of the exchange processor are available for the actual switching technology; i.e., the control of the transmission of voice information.

So that no overload occurs insofar as possible and, thus, so that one avoids having calls rejected by an overloaded exchange processor, as a result whereof the operator would lose charges due to the rejected calls, the delay in the enable of the second transmission units is already begun earlier than the actual rejection of calls.

The determination of the suitable time delay for the release of the second transmission units by the monitoring means is explained below with reference to FIGS. 2 and 3.

FIG. 2 shows the usage value occurring in terms of time within a plurality of clock units at one of the exchange processors, this being monitored by the corresponding monitoring means. An upper limit value $S_1$ and a lower limit value $S_2$ for the usage value is preferably defined. When the usage value of the monitored exchange processor exceeds the upper limit value $S_1$, then an internal counter is incremented. The internal counter is de-incremented given downward transgression of the lower limit value $S_2$. When the usage value lies between the two limit values $S_2$ and $S_1$, then the counter reading remains unmodified. Proceeding from these pre-conditions, the correspondingly illustrated counter reading derives for the course of the occupancy of the exchange processor shown in FIG. 2. As soon as a counter reading greater than zero occurs, the correspondingly provided monitoring means conclude that the risk of an overload of the monitored exchange processor is established, and produce a delay of the enable of the corresponding, second transmission units in order to assure a recovery of the monitored exchange processor. The delay of the enable of the second transmission units is thereby set dependent on the load or, respectively usage degree of the monitored exchange processor; i.e., the duration of the delay is lengthened or shortened dependent on the counter reading of the overload counter.

The delay of the enable of the second transmission unit begins immediately with the occurrence of a counter reading greater than zero; i.e., after recognition of an impending overload of the monitored exchange processor. So that incoming subscriber calls need not be rationally rejected, the duration of a specific time span is first waited for and incoming subscriber calls are only rejected after expiration of this time span if an impending overload of the monitored exchange processor is still established after expiration of this time span; for example, the overload counter still exhibits a counter reading greater than zero after the expiration of this time span. The delay of the enable of the second transmission units thus begins before an actually occurring overload of the monitored exchange processor.

This shall be illustrated below with reference to FIG. 3.

As already shown in FIG. 2, the occupancy or, respectively, usage degree of a corresponding exchange processor is monitored regularly by the monitoring means. According to FIG. 3, the corresponding clock period amounts to 2 seconds. Respectively following expiration of a clock period, the monitoring means determine the usage degree of the exchange processor monitored by it and generate the counter reading of the overload counter already explained with reference to FIG. 2. It is thereby assumed in FIG. 3 that the occupancy degree of the monitor exchange processor always lies above the upper threshold $S_1$ shown in FIG. 2 over the monitoring range taken into consideration in FIG. 3, so that the overload counter is continuously incremented. As a rule, an upper limit for tile overload counter is provided so that it can only assume counter values within a specific range; for example, between 0 and 9.

Given the example shown in FIG. 3, a time span covering two clock periods is assumed as the aforementioned time span. Accordingly, the counter curve, which trails the counter reading of the overload counter by two clock periods as is shown in the third line of FIG. 3, derives for the counter reading actually employed for the actual load reduction of the monitored exchange processor. After expiration of these two clock periods, the monitoring means check whether, after determination of the previously occurring overload risk, an overload risk is, in fact, still established for the monitored exchange processor. When yes, incoming subscriber call attempts are rejected dependent on the counter reading shown in the third line of FIG. 3 so that the percentage load reductions of the monitored exchange processor shown in the fourth line of FIG. 3 derive dependent on the counter reading shown in FIG. 3. As such, for example, a 100% load reduction occurs for all counter values greater than 3.

In table form, FIG. 4 shows the percentage reduction of the telephone number information traffic given a full utilization of the second transmission units present in an exchange unit. The value 1.5 s, on the one hand, and the value 3 s on the other hand, is thereby set for the average occupancy duration tm of the second transmission units (without delay of the enable).

The corresponding overall occupancy time of the second transmission units and the total number of call attempts BHHCA (busy hour half call attempts) deriving therefrom and processed by the second transmission units is shown in the table illustrated in FIG. 4 for each delay value of the second transmission units. The reduction in the load of the corresponding switching processes by the second transmission units that derives as a percentage from the occupancy lengthening also is shown in the respective third column. It can be seen from FIG. 4 that the call requests processed by the second transmission units decrease with increasing enable delay, or increasing occupancy duration, of the second transmission units so that the load on the corresponding exchange processor drops.

Although the present invention has been described with reference to specific embodiments, those skill in the art will recognize that changes may be made thereto without departing from the spirit and scope of the invention as set forth in the hereafter appended claims.

What is claimed is:

1. Switching equipment for setting up a connection either between at least two pieces of terminal equipment which are connectable to the switching equipment or between one piece of terminal equipment connectable to the switching equipment and an exchange line connected to the switching equipment, the switching equipment comprising:

at least two exchange units respectively allocated either to at least one of the pieces of terminal equipment or to at least one exchange line;

a first transmission unit in each exchange unit for transmitting voice information;

at least one second transmission unit in at least one exchange unit for transmitting terminal equipment-related supplementary information to at least one other exchange unit;

an exchange processor means allocated to each exchange unit for controlling the respective exchange unit; and monitoring means in each exchange unit for monitoring a usage degree of the respective exchange processor means and, given a determination of a specific usage degree of the respective exchange processor means, for delaying an enable of the at least one second transmission unit of the respective exchange unit for transmitting the terminal equipment-related supplementary information.

2. Switching equipment as claimed in claim 1, wherein the monitoring means is integrated into the respective exchange processor means of the respective exchange unit.

3. Switching equipment as claimed in claim 1, further comprising:

a central processor means for controlling voice and supplementary information transmission between the at least two exchange units, wherein each exchange processor means informs the central processor means of the enable of the at least one second transmission unit of the respective exchange unit for transmitting the supplementary information related to the terminal equipment, and wherein the central processor means selects only the second transmission units for transmitting the terminal equipment-related supplementary information that is enabled by the respective exchange processor means.

4. Switching equipment as claimed in claim 1, wherein the monitoring means lengthens the delay of the enable of the second transmission unit of the respective exchange unit with increasing usage degree of the respective exchange processor means.

5. Switching equipment as claimed in claim 1, further comprising:

a plurality of second transmission units in each exchange unit for transmitting the terminal equipment-related supplementary information, wherein the monitoring means delays enable of all the second transmission units of the respective exchange unit after identifying the specific usage degree of the respective exchange processor means.

6. Switching equipment as claimed in claim 1, further comprising:

a telephone number of a calling terminal equipment as part of the terminal equipment-related supplementary information.

7. Switching equipment as claimed in claim 1, further comprising:

counter means in each of the monitoring means wherein each of the monitoring means interrogates the usage degree of the respective exchange processor means at regular intervals and increments the respective counter means given upward transgression of the specific usage degree.

8. Switching equipment as claimed in claim 7, wherein the monitoring means de-increments the respective counter means given downward transgression of a specific, lower usage degree of the respective exchange processor means.

9. Switching equipment as claimed in claim 7, wherein the monitoring means lengthens a duration of the delay of the enable of the at least one second transmission unit of the respective exchange unit after determining an upper transgression of the specific usage degree of the respective exchange processor means with an increasing counter reading of the respective counter means.

10. Switching equipment as claimed in claim 1, wherein the monitoring means immediately implements the enable delay of the at least one second transmission unit of the respective exchange unit after determining an upper transgression of the specific usage degree of the respective exchange processor means.

11. Switching equipment as claimed in claim 1, wherein the specific usage degree lies below a usage degree whereat an overload of the exchange processor means that leads to a rejection of connection requests would occur.

* * * * *